United States Patent
Lin

(10) Patent No.: US 10,075,866 B2
(45) Date of Patent: Sep. 11, 2018

(54) ACCESSING FAILURE EVENT REPORTING METHOD, USER EQUIPMENT, METHOD FOR ADJUSTING ACCESS CONTROL MECHANISM, CONTROL NODE

(71) Applicant: Industrial Technology Research Institute, Hsinchu (TW)

(72) Inventor: Jung-Mao Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 119 days.

(21) Appl. No.: 14/951,519

(22) Filed: Nov. 25, 2015

(65) Prior Publication Data
US 2016/0165473 A1 Jun. 9, 2016

Related U.S. Application Data
(60) Provisional application No. 62/089,180, filed on Dec. 8, 2014.

(51) Int. Cl.
| | | |
|---|---|---|
| *H04L 12/00* | (2006.01) | |
| *H04W 24/10* | (2009.01) | |
| *H04W 76/27* | (2018.01) | |

(52) U.S. Cl.
CPC ........... *H04W 24/10* (2013.01); *H04W 76/27* (2018.02)

(58) Field of Classification Search
CPC ............................... H04W 24/10; H04W 76/27
See application file for complete search history.

(56) References Cited

U.S. PATENT DOCUMENTS
| | | |
|---|---|---|
| 8,724,497 B2 | 5/2014 | Johansson et al. |
| 2011/0117905 A1 | 5/2011 | Huang et al. |
| 2012/0088457 A1 | 4/2012 | Johansson et al. |
| 2012/0282968 A1 | 11/2012 | Toskala et al. |
| 2013/0016702 A1 | 1/2013 | Yan et al. |
| 2013/0040634 A1 | 2/2013 | Johansson et al. |
| 2013/0072182 A1 | 3/2013 | Jung et al. |

(Continued)

FOREIGN PATENT DOCUMENTS
| | | |
|---|---|---|
| CN | 102355692 | 2/2012 |
| CN | 102740327 | 10/2012 |

(Continued)

OTHER PUBLICATIONS
CMCC, "New Study Item Proposal: Further Enhancements of Minimization of Drive Tests for E-UTRAN," 3GPP TSG-RAN Meeting #65, RP-141262, Sep. 9-12, 2014, pp. 1-7.

(Continued)

*Primary Examiner* — Alvin Zhu
(74) *Attorney, Agent, or Firm* — JCIPRNET

(57) ABSTRACT
An accessing failure event reporting method, UE, a method for adjusting access control mechanism and a control node are proposed. The accessing failure event reporting method includes: receiving a configuration signal when the UE is preparing into idle mode; performing an accessibility measurement of a GBR mechanism in response to the configuration signal. The accessibility measurement includes: attempting to establish a GBR traffic connection; recording at least one accessing failure event if the UE fails to establish the GBR traffic connection; and reporting the at least one accessing failure event.

29 Claims, 5 Drawing Sheets

(56) References Cited

U.S. PATENT DOCUMENTS

| | | | |
|---|---|---|---|
| 2013/0083667 A1 | 4/2013 | Persson et al. | |
| 2013/0121225 A1 | 5/2013 | Ryu | |
| 2013/0128733 A1 | 5/2013 | Lee et al. | |
| 2013/0196650 A1 | 8/2013 | Futaki | |
| 2013/0203406 A1 | 8/2013 | Chuang | |
| 2014/0192703 A1* | 7/2014 | Chun | H04W 76/002 370/312 |
| 2014/0269574 A1 | 9/2014 | Kim et al. | |
| 2014/0370890 A1* | 12/2014 | Huang | H04W 48/02 455/434 |
| 2015/0031366 A1 | 1/2015 | Lee et al. | |
| 2015/0173119 A1* | 6/2015 | Wirtanen | H04W 48/06 455/452.1 |
| 2015/0181461 A1* | 6/2015 | Kim | H04W 74/08 370/236 |
| 2015/0257161 A1* | 9/2015 | Hsu | H04W 72/0486 455/453 |
| 2016/0198364 A1* | 7/2016 | Schwarzbauer | H04W 28/08 370/331 |

FOREIGN PATENT DOCUMENTS

| | | |
|---|---|---|
| CN | 103428730 | 12/2013 |
| CN | 103944943 | 7/2014 |
| TW | 201334585 | 8/2013 |
| TW | I446811 | 7/2014 |

OTHER PUBLICATIONS

3rd Generation Partnership Project, "Technical Specification Group Services and System Aspects; Telecommunication management;Subscriber and equipment trace:Trace concepts and requirements," 3GPP TS 32.421, Dec. 2009, pp. 1-33.

Nokia Siemens Networks et al., "Considerations on MDT QoS verification," 3GPP TSG-RAN WG2 Meeting #75bis, R2-114928, Oct. 10-14, 2011, pp. 1-5.

3rd Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description," 3GPP TS 37.320 V11.0.0, Jun. 2012, pp. 1-20.

3rd Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description," 3GPP TS 37.320 V10.4.0, Dec. 2011, pp. 1-18.

CMCC, "Consideration on MDT Further Enhancements," TSG RAN meeting #64, RP-140706, Jun. 10-13, 2014, pp. 1-10.

"Office Action of Taiwan Counterpart Application", dated Oct. 27, 2016, p. 1-p. 8.

"Office Action of China Counterpart Application," dated Jun. 15, 2018, pp. 1-5.

* cited by examiner

ACCESSING FAILURE EVENT REPORTING METHOD, USER EQUIPMENT, METHOD FOR ADJUSTING ACCESS CONTROL MECHANISM, CONTROL NODE

CROSS-REFERENCE TO RELATED APPLICATION

This application claims the priority benefits of U.S. provisional application Ser. No. 62/089,180, filed on Dec. 8, 2014. The entirety of the above-mentioned patent application is hereby incorporated by reference herein and made a part of this specification.

TECHNICAL FIELD

The disclosure relates to an accessing failure event reporting method, UE, a method for adjusting access control mechanism and a control node.

BACKGROUND

In current communication system, some specific traffic type, like guaranteed bit rate (GBR) traffic, should be prioritized. The GBR traffic may include traffic of IP (i.e., Internet protocol) multimedia subsystem (IMS) services such as multi media telephony (MMTEL) video/voice or short message service (SMS) traffic. Generally speaking, the GBR traffic usually has higher Quality of Service (QoS) level than non-GBR traffics. However, in current $3^{rd}$ generation partnership project (3GPP) specifications, the network could guarantee higher QoS level for the GBR traffic only after the IMS connection has been successfully established between user equipment (UE) and the network. Otherwise, the network cannot prioritize the GBR traffic while establishing the IMS connection.

To resolve this issue, the working item (WI) called "New Work Item Proposal on Smart Congestion Mitigation in E-UTRAN" was discussed in 3GPP. This WI was about how to prioritize the GBR traffic, like MMTEL video/voice and SMS traffic, before successfully establishing the IMS connection. After the WI discussion, the access class barring (ACB) skip mechanism was proposed to resolve the issue. In the ACB skip mechanism, the network could control which type of the GBR traffic (e.g., MMTEL video/voice or SMS traffic) could skip the ACB check. In this way, some of the GBR traffic could skip the ACB check to have higher priority to access the network. However, how to prioritize GBR traffic on random access (RA) procedure was not discussed in the WI.

Since the network could prioritize some of the GBR traffics at network access procedure by ACB skip mechanism, the network still needs more info illation to decide when and how to perform the specific access control mechanism. In addition, if the network has more information about the access state of the GBR traffic, it could understand the potential GBR traffic distribution by statistics thereof and perform appropriate control mechanism to guarantee the QoS level of the GBR traffic.

SUMMARY

Accordingly, the disclosure is directed to an accessing failure event reporting method, UE, a method for adjusting access control mechanism and a control node. The method of the disclosure proposes a novel accessibility measurement, such that the UE may report accessing failure events at specific scenarios. With the reported accessing failure events, the control node may have more information about the access state of the GBR traffic, and the decision about when and how to perform the specific access control mechanism (e.g., ACB skip mechanism) could be more appropriate.

An exemplary embodiment of the disclosure proposes an accessing failure event reporting method adapted to UE. The method includes: receiving a configuration signal when the UE is preparing into idle mode; performing an accessibility measurement of a GBR mechanism in response to the configuration signal. The accessibility measurement comprises: attempting to establish a GBR traffic connection; recording at least one accessing failure event if the UE fails to establish the GBR traffic connection; and reporting the at least one accessing failure event.

An exemplary embodiment of the disclosure proposes a UE which includes a storage circuit, a transceiver and a processor. The storage circuit stores a plurality of modules. The processor is operatively coupled to the storage circuit and the transceiver. The processor accesses and executes the modules which includes a receiving module and a measuring module. The receiving module controls the transceiver to receive a configuration signal when the UE is preparing into idle mode. The measuring module performs an accessibility measurement of a GBR mechanism in response to the configuration signal. The accessibility measurement includes: controlling the transceiver to attempt to establish a GBR traffic connection; recording at least one accessing failure event if the UE fails to establish the GBR traffic connection; and controlling the transceiver to report the at least one accessing failure event.

An exemplary embodiment of the disclosure proposes a method for adjusting access control mechanism adapted to a control node. The method includes: sending a configuration signal to UE being preparing into idle mode to request the UE to perform an accessibility measurement of a GBR mechanism and report at least one accessing failure event recorded in the accessibility measurement; receiving the at least one accessing failure event from the UE; and adjusting an access control mechanism based on the at least one accessing failure event.

An exemplary embodiment of the disclosure proposes a control node which includes a storage circuit, a transceiver and a processor. The storage circuit stores a plurality of modules. The processor is operatively coupled to the storage circuit and the transceiver. The processor accesses and executes the modules which includes a configuring module, a transceiving module and an adjusting module. The configuring module controls the transceiver to send a configuration signal to UE being preparing into idle mode to request the UE to perform an accessibility measurement of a GBR mechanism and report at least one accessing failure event recorded in the accessibility measurement. The transceiving module controls the transceiver to receive the at least one accessing failure event from the UE. The adjusting module adjusts an access control mechanism based on the at least one accessing failure event.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
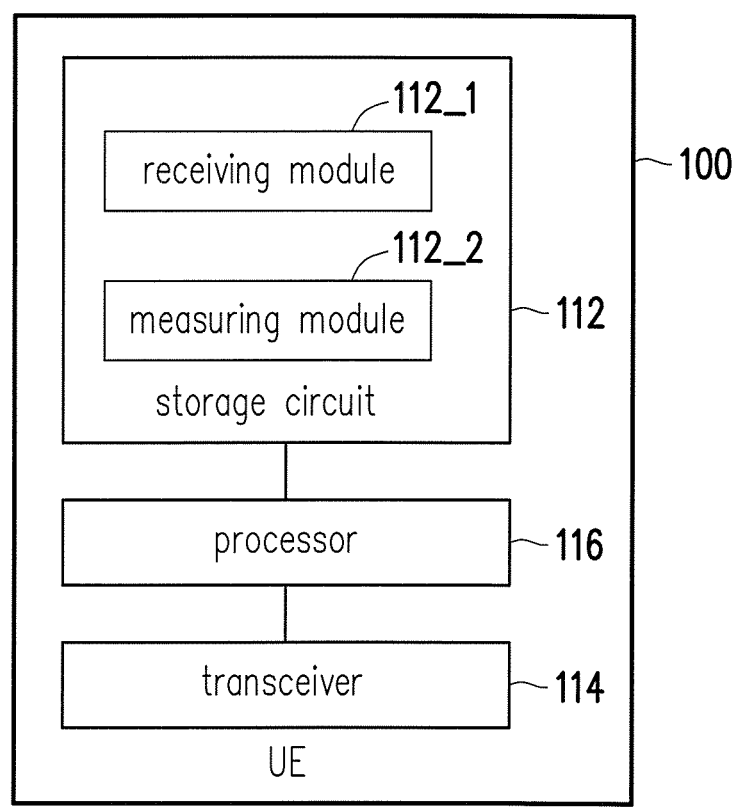
FIG. 1 illustrates a functional block diagram of a UE according to an exemplary embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

In this disclosure, the meaning of the terms "if" and "when" could be equal to "only if" and "only when" in some embodiments. Moreover, 3GPP-like keywords or phrases are used merely as examples to present inventive concepts in accordance with the disclosure; however, the same concept presented in the disclosure can be applied to any other systems such as IEEE 802.11, IEEE 802.16, WiMAX, and so like by persons of ordinarily skilled in the art.

FIG. 1 illustrates a functional block diagram of a UE according to an exemplary embodiment of the disclosure. The term "UE" in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

In the embodiment, a UE 100 includes a storage circuit 112, a transceiver 114 and a processor 116. The storage circuit 112 could be one or a combination of a stationary or mobile random access memory (RAM), read-only memory (ROM), flash memory, hard disk, or any other similar device. The transceiver 114 may include a transmitter circuit, a receiver circuit, an analog-to-digital (A/D) converter, a digital-to-analog (D/A) converter, one or more antenna units, and optionally a storage medium. The transmitter circuit and the receiver circuit transmit uplink signals and receive downlink signals wirelessly. The receiver circuit may include functional elements to perform operations such as low noise amplifying, impedance matching, frequency mixing, down frequency conversion, filtering, amplifying, and so forth. The transmitter circuit may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processor 116 may be operatively coupled to the storage circuit 112 and the transceiver 114. The processor 116 may be a general purpose processor, a specific purpose processor, a conventional processor, a digital signal processor (DSP), a plurality of microprocessors, one or more microprocessors integrated with a DSP core, a controller, a micro-controller, an application specific integrated circuit (ASIC), a field programmable gate array (FPGA), any other type of integrated circuit, a state machine, an advanced RISC machine-based processor or the like.

In an exemplary embodiment of the disclosure, the processor 116 could access and execute a receiving module 112_1 and a measuring module 112_2 recorded in the storage circuit 112 to perform a proposed accessing failure event reporting method.

Figure 2:
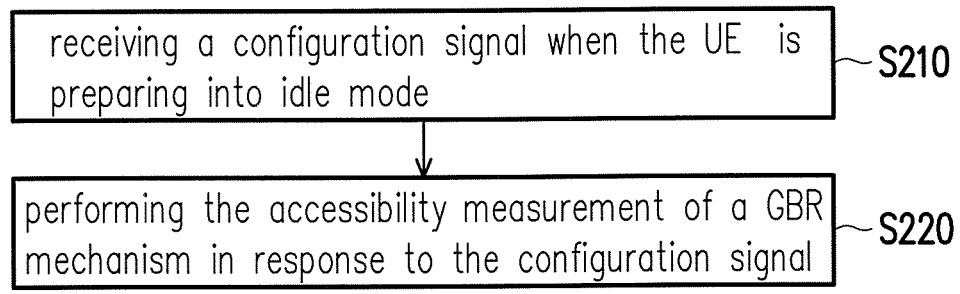
FIG. 2 is a flow chart illustrating the accessing failure event reporting method according to an exemplary embodiment of the disclosure.

FIG. 2 is a flow chart illustrating the accessing failure event reporting method according to an exemplary embodiment of the disclosure. The method of the embodiment may be performed by the UE 100 of FIG. 1, and each step of the method will be described with reference to each element depicted in FIG. 1.

In step S210, the receiving module 112_1 could control the transceiver 114 to receive a configuration signal when the UE 100 is preparing into idle mode. The idle mode could be a radio resource control (RRC) idle mode defined in the 3GPP specifications, but the disclosure is not limited thereto. In one embodiment, the configuration signal may be sent by a control node and dedicated to request the UE 100 to perform an accessibility measurement. Conventionally, a UE would automatically perform the accessibility measurement without being configured by the control node, which is different from the disclosure.

The control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations. The control node may also be referred to entities such as a trace collection entity (TCE), mobility management entity (MME), a serving gateway (S-GW), a packet data network gateway (PDN-GW), a serving GPRS support node (SGSN), a gateway GPRS support node (GGSN), a mobile switching center (MSC), and a home subscriber server (HSS) or a node maintaining a database related to subscriber information.

Figure 3:
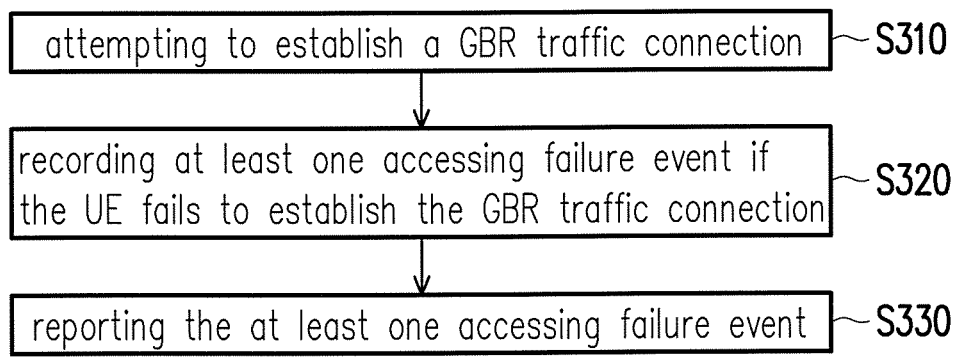
FIG. 3 is a flow chart illustrating the accessibility measurement of the GBR mechanism according to FIG. 2.

In step S220, the measuring module 112_2 could perform the accessibility measurement of a GBR mechanism in response to the configuration signal. Details of step S220 could be referred to FIG. 3. FIG. 3 is a flow chart illustrating the accessibility measurement of the GBR mechanism according to FIG. 2. In step S310, the UE 100 could attempt to establish a GBR traffic connection. In step S320, the measuring module 112_1 could record at least one accessing failure event if the UE 100 fails to establish the GBR traffic connection. In step S330 the measuring module 112_1 could report the at least one accessing failure event.

In the disclosure, there are two main issues making the UE 100 fail to establish the GBR traffic connection: (1) barred in the ACB check; (2) failing to finish the random access (RA) procedure, but the disclosure is not limited thereto. For dealing with the two issues, the disclosure proposes two exemplary embodiments implementing steps S310-S330 in different ways, which would be respectively described as a first embodiment and a second embodiment as follows.

In the first embodiment, when the UE 100 attempts to establish a GBR traffic connection in step S310, the UE 100 could perform a ACB check. Details of the ACB check could be referred to 3GPP specifications (e.g., release-12 of the long term evolution (LTE)), which would not be provided herein. If the UE 100 fails to pass the ACB check (i.e., the UE 100 is barred by the ACB check), the establishment the GBR traffic connection would fail correspondingly. This kind of accessing failure event about failing to establish the GBR traffic connection could be referred as a barred event in the disclosure. Under this situation, the measuring module 112_1 could record the barred event (corresponding to step S320).

In a first alternative of the first embodiment, the measuring module 112_1 could record at least a serving cell identification (ID), a GBR traffic type, a location, or a time stamp for a number of the barred event. Specifically, the serving cell ID may be the ID of the cell with which the UE 100 attempts to establish the GBR traffic connection. The GBR traffic type may be the type of the GBR traffic connection, such as MMTEL video/voice traffic or SMS traffic, etc. The location may be the place where the UE 100 being barred in the ACB check, and the time stamp may be the time when the UE 100 being barred in the ACB check. In some embodiments, the locations and time stamps of the barred events corresponding to the same serving cell ID and GBR traffic type could be integrated as a location list and a time stamp list. Further, the number of the barred events corresponding to the same serving cell ID and GBR traffic type could be summed up as well. The recorded barred events could be characterized as the following Table 1.

TABLE 1

| serving cell ID | GBR traffic type | BarNum | Location | time stamp |
| --- | --- | --- | --- | --- |
| cell 1 | MMTEL voice | 2 | location list 1 | time stamp list 1 |
| cell 3 | SMS | 1 | location list 2 | time stamp list 2 |

One of the elements of the column named "BarNum" represents the number of the barred event. For example, Table 1 shows that the number of the barred events corresponding to the cell 1 and the MMTEL voice is 2, which means that the GBR traffic type "MMTEL voice" has been barred in the ACB check in the cell 1 twice. The locations and the time stamps of the two barred events could be recorded in the "location list 1" and the "time stamp list 1," respectively. The meanings of other elements in Table 1 could be deducted based on the aforementioned teachings, which would not be provided herein.

Afterwards, the measuring module 112_1 could control the transceiver 114 to report the serving cell identification, the GBR traffic type, the location, the time stamp and the number of the barred event if a RRC connection is available (corresponding to step S330). In one embodiment, the measuring module 112_1 could control the transceiver 114 to transmit the information of Table 1 to the control node having the RRC connection with the UE 100.

As a result, the control node may have more information about the access state of the GBR traffic, and understand the potential GBR traffic distribution (e.g., locations, time stamps, and GBR traffic type, etc.) by statistics thereof and perform appropriate access control mechanism to guarantee the QoS level of the GBR traffic. For example, the control node may activate the ACB skip mechanism if one of the "BarNum" or the sum of the "BarNum" reaches a predetermined threshold (e.g., 1000 or other values chosen by the designer).

In a second alternative of the first embodiment, the measuring module 112_1 may merely record the "BarNum" of the barred event corresponding to various GBR traffic types (corresponding to step S320). Under this situation, the measuring module 112_1 may control the transceiver 114 to send a dedicated preamble to the control node without passing the ACB check if a number of the barred event reaches a predetermined threshold (corresponding to step S330). In the embodiment, the dedicated preamble is used to announce that the at least one accessing failure event exists. Besides, the dedicated preamble is shared by the UE 100 and other UEs. In one embodiment, different GBR traffic types may be configured with identical or different predetermined thresholds, and the measuring module 112_1 could control the transceiver 114 to send the dedicated preamble when one of the "BarNum" reaches the corresponding predetermined threshold. In another embodiment, the measuring module 112_1 could control the transceiver 114 to send the dedicated preamble when the sum of the "BarNum" corresponding to all of the GBR traffic types reaches a predetermined threshold. Afterwards, the measuring module 112_1 could clear the at least one accessing failure event (e.g., the barred events) and returning to the idle mode. In other embodiments, the measuring module 112_1 could clear the at least one accessing failure event after the UE 100 experiences a cell-reselection for avoiding the newly connected control node to be confused with the at least one accessing failure event related to the control node previously connected with the UE 100.

Since the characteristics of the dedicated preamble are different from conventional preambles, the control node may not assign a random access response (RAR) in response to the dedicated preamble. In detail, conventional preambles are selected by UEs itself. However, the dedicated preamble is shared by the UE 100 and other UEs, which means that the dedicated preambles used by the UE 100 and other UEs are identical. The dedicated preamble could be used to represent the access failure event and the dedicated preamble could be preconfigured to the UE 100 by the configuration signal. Besides, conventional UE cannot send signals to the control node if it fails to pass the ACB check. However, the method proposed in the disclosure allows the UE 100 to send the dedicated preamble even if the UE 100 fails to pass the ACB check.

In some embodiments, the barred events having different GBR traffic types may be configured with different dedicated preambles. Therefore, the control node receiving the dedicated preambles could recognize that which GBR traffic type of the barred events has been barred. Besides, different UEs could still use the same dedicated preamble to report the barred events having the same GBR traffic type.

As a result, the control node may have more information about the access state of the GBR traffic, and understand the potential GBR traffic distribution (e.g., GBR traffic type) by statistics thereof and perform appropriate control mechanism to guarantee the QoS level of the GBR traffic. For example, the control node may activate the ACB skip mechanism if the number of the dedicated preambles reaches a predetermined threshold. For another example, the control node may activate the ACB skip mechanism if the sum of the different dedicated preambles reaches a predetermined threshold.

In the second embodiment, when the UE 100 attempts to establish a GBR traffic connection in step S310, the UE 100 could control the transceiver 114 to send a RRC connection request message and starting a timer. The timer could be a T300 timer defined in LTE, but the disclosure is not limited thereto. If the UE 100 fails to receive a RRC connection setup message before the timer expires, the establishment the GBR traffic connection would fail correspondingly. This kind of accessing failure event about failing to establish the GBR traffic connection could be referred as a random access (RA) failure event in the disclosure. Under this situation, the measuring module 112_1 could record the RA failure event (corresponding to step S320).

Conventionally, the RA failure event could be characterized as the following Table 2 (i.e., a VarConnEstFailReport message defined in release-12 of the LTE).

TABLE 2

| plmn-Identity | failedCellId | | measResultFailedCell | measResultNeighCells |
|---|---|---|---|---|
| failedCellId | numberOfPreamblesSent | contentionDetected | | maxTxPowerReached |

The characteristics of each of the fields in Table 2 could be referred to 3GPP specifications (e.g., release-12 of the LTE), which would not be provided herein. It could be observed from Table 2 that the conventional UE does not inform the control node the GBR traffic type of the RA failure event. Besides, the conventional UE would merely report the latest RA failure event to the control node. Therefore, the control node cannot understand the potential GBR traffic distribution by statistics thereof and cannot perform appropriate control mechanism to guarantee the QoS level of the GBR traffic with the conventional VarConnEstFailReport message.

However, in a first alternative of the second embodiment of the disclosure, the RA failure event is further configured with the GBR traffic type thereof by modifying the VarConnEstFailReport message as shown in the following Table 3.

TABLE 3

| plmn-Identity | failedCellId | | measResultFailedCell | measResultNeighCells | GBR connection tag |
|---|---|---|---|---|---|
| locationInfo | numberOfPreamblesSent | contentionDetected | | maxTxPowerReached | |

In Table 3, the field "GBR connection tag" could indicate which of the GBR traffic type suffers from the RA failure event. After the UE 100 reporting the information of Table 3 to the control node, the control node would correspondingly understand that which of the GBR traffic type suffers from the RA failure event and perform appropriate control mechanism to guarantee the QoS level of the GBR traffic.

In a second alternative of the second embodiment, Table 3 could be further modified as a VarGBRConnEstFailReport message as shown in the following Table 4.

TABLE 4

| plmn-Identity | numberOfPreamblesSent | maxTxPowerReached |
|---|---|---|
| failedCellId | contentionDetected | GBR connection tag |

Besides, the VarGBRConnEstFailReport message could log each of the RA failure event (including historical RA failure events). After the UE 100 reporting the information of Table 4 to the control node when the UE 100 enters the RRC connected mode, the control node would further understand that which of the GBR traffic type suffers from the historical RA failure events and perform appropriate control mechanism to guarantee the QoS level of the GBR traffic.

In a third alternative of the second embodiment, the RA failure events having similar characteristics could be merged to reduce the size of the VarGBRConnEstFailReport message. For example, if there exist RA failure events having identical contents in the fields "plmn-Identity," "failedCellId" and "GBR connection tag," these RA failure events could be merged as a new RA failure event. The new RA failure event may be configured to record the number of the RA failure events having identical values in the aforementioned fields.

Figure 4:
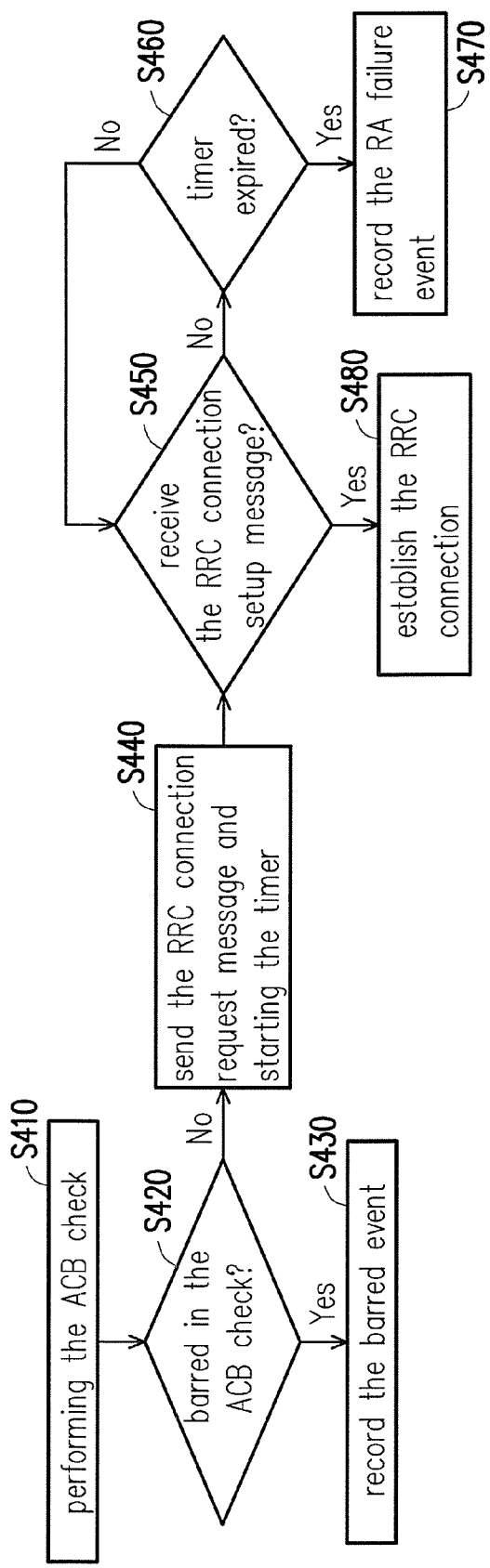
FIG. 4 is illustrates a flow chart of an exemplary embodiment of the disclosure.

In some embodiments, the first embodiment and the second embodiment could be combined as a third embodiment. FIG. 4 is illustrates a flow chart of the third exemplary embodiment of the disclosure. The method of the embodiment may be performed by the UE 100 of FIG. 1, and each step of the method will be described with reference to each element depicted in FIG. 1.

In step S410, the UE 100 may perform the ACB check. In step 320, the UE 100 may determine whether the UE 100 is barred in the ACB check. If yes, the UE 100 may record the barred event in step S430. On the other hand, the UE 100 may send the RRC connection request message and starting the timer in step S440 after passing the ACB check. In step S450, the UE 100 may determine whether receiving the RRC connection setup message. If yes, the UE 100 may establish the RRC connection (with the control node) in step S480; if no, the UE 100 may determine whether the timer has expired in step S460. If the timer has not expired, the UE 100 may return to step S450, otherwise the UE 100 may record the RA failure event in step S470. In the embodiment, the UE 100 could return to step S410 after steps S430 and 370. Besides, steps S410-S470 could be iteratively executed until one or more of the conditions for reporting the barred event and/or the RA failure event mentioned in the first/second embodiment. Details of each steps of the embodiment could be referred to the first and/or the second embodiments, which would not be repeated herein.

Figure 5:
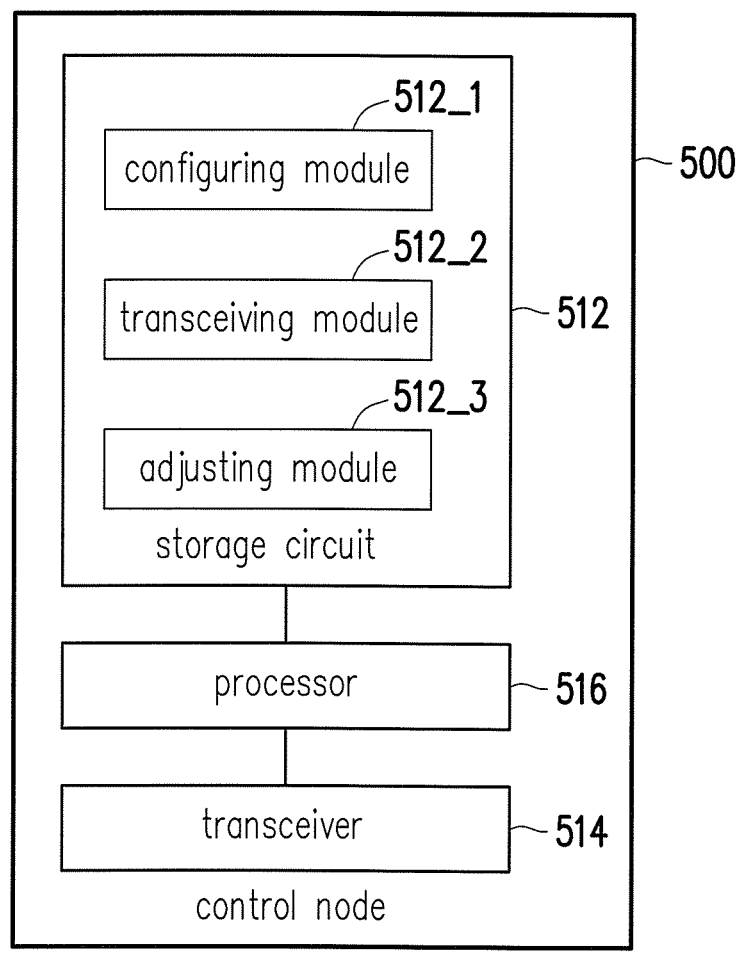
FIG. 5 illustrates a functional block diagram of a control node according to an exemplary embodiment of the disclosure.

FIG. 5 illustrates a functional block diagram of a control node according to an exemplary embodiment of the disclosure. In the embodiment, a control node 500 may include a storage circuit 512, a transceiver 514 and a processor 516. The functions of each element of the control node 500 are similar to the UE 100 and therefore detailed descriptions for each element will not be repeated. The processor 516 could access and execute a configuring module 512_1, a transceiving module 512_2 and an adjusting module 512_3 recorded in the storage circuit 512 to perform a proposed method for adjusting access control mechanism.

Figure 6:
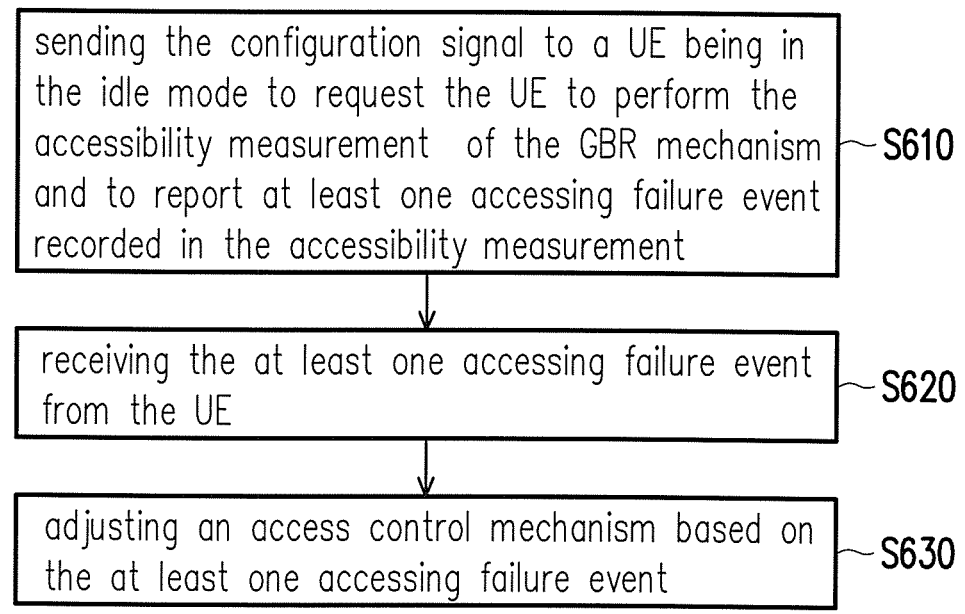
FIG. 6 is a flow chart illustrating the method for adjusting access control mechanism according to an exemplary embodiment of the disclosure.

FIG. 6 is a flow chart illustrating the method for adjusting access control mechanism according to an exemplary embodiment of the disclosure. The method of the embodiment may be performed by the control node 500 of FIG. 5, and each step of the method will be described with reference to each element depicted in FIG. 5.

In the embodiment, it is assumed that the UE 100 is served by the control node 500, and hence the control node 500 could interact with the UE 100 as mentioned in the aforementioned embodiments. Specifically, the configuring module may send the configuration signal to the UE 100 being preparing into the idle mode to request the UE 100 to perform the accessibility measurement of the GBR mechanism and to report at least one accessing failure event recorded in the accessibility measurement in step S610. Details of the operations performed by the UE 100 in response to the configuration signal could be referred to the aforementioned embodiments, which would not be repeated herein.

In step S620, the transceiving module 512_2 could control the transceiver 514 to receive the at least one accessing failure event from the UE 100. The at least one accessing failure event reported by the UE 100 could vary based on which of the alternatives and embodiments is chosen by the designer. For example, the transceiving module 512_2 may control the transceiver 514 to receive the serving cell ID, the GBR traffic type, the location, the time stamp and the number of the barred event if the RRC connection between the UE 100 and the control node 500 is available if the designer chooses to implement the first alternative of the first embodiment. For another example, the transceiving module 512_2 may control the transceiver 514 to receive the dedicated preamble from the UE 100 and not assign the RAR in response to the dedicated preamble if the designer chooses to implement the second alternative of the first embodiment. For yet another example, if the designer chooses to implement the alternatives of the second embodiment, the transceiving module 512_2 may control the transceiver 514 to receive information provided in Table 2 and Table 3.

In step S630, the adjusting module 512_3 could adjust an access control mechanism based on the at least one accessing failure event. For example, the control node 500 may activate the ACB skip mechanism if the number of the dedicated preambles from the UE 100 and the other UEs reaches a threshold, but the disclosure is not limited thereto.

To sum up, the embodiments of the disclosure proposes an accessing failure event reporting method, UE, a method for adjusting access control mechanism and a control node. In the accessing failure event reporting method, the UE may perform the accessibility measurement to record various accessing failure events after being configured by the control node. Afterwards, the UE may report the recorded accessing failure events to the control node if some specific reporting criteria are satisfied. With the various accessing failure events reported by the UE, the control node may have more information about the access state of the GBR traffic, and understand the potential GBR traffic distribution (e.g., locations, time stamps, and GBR traffic type, etc.) by statistics thereof and perform appropriate access control mechanism to guarantee the QoS level of the GBR traffic.

It will be apparent to those skilled in the art that various modifications and variations can be made to the structure of the disclosure without departing from the scope or spirit of the disclosure. In view of the foregoing, it is intended that the invention cover modifications and variations of this disclosure provided they fall within the scope of the following claims and their equivalents.

What is claimed is:

1. An accessing failure event reporting method, adapted to user equipment (UE), comprising:
   receiving a configuration signal when the UE is preparing into idle mode;
   performing an accessibility measurement of a guaranteed bit rate (GBR) mechanism in response to the configuration signal, wherein the accessibility measurement comprises:
      attempting to establish a GBR traffic connection to perform an access class barring (ACB) check;
      recording at least one accessing failure event if the UE fails to establish the GBR traffic connection, wherein the at least one accessing failure event comprising a barred event representing that the UE fails to pass the ACB check; and
   reporting the at least one accessing failure event,
   wherein if the UE fails to establish the GBR traffic connection, the step of recording the at least one accessing failure event comprises:
      recording the barred event if the UE fails to pass the ACB check,
   wherein the step of reporting the at least one accessing failure event further comprises:
      sending a dedicated preamble without passing the ACB check if a number of the barred event reaches a predetermined threshold, wherein the dedicated preamble is used to announce that the at least one accessing failure event exists and is shared by the UE and other user equipments.

2. The method of claim 1, wherein the configuration signal is sent by a control node and is dedicated to request the UE to perform the accessibility measurement.

3. The method of claim 1, wherein the step of reporting the at least one accessing failure event further comprises:
   reporting a serving cell identification, a GBR traffic type, a location, a time stamp and a number of the barred event if a radio resource control (RRC) connection is available; and
   clearing the at least one accessing failure event after reporting.

4. The method of claim 1, wherein the step of reporting the at least one accessing failure event further comprises:
   clearing the at least one accessing failure event and returning to the idle mode.

5. The method of claim 4, further comprising:
   clearing the at least one accessing failure event after the UE experiences a cell-reselection.

6. The method of claim 1, wherein the at least one access failure event comprises a random access (RA) failure event, and the step of attempting to establish the GBR traffic connection further comprises:
   sending a radio resource control (RRC) connection request message and starting a timer; and
   if the UE fails to establish the GBR traffic connection, the step of recording the at least one accessing failure event comprises:
      recording the RA failure event if the UE fails to receive a RRC connection setup message before the timer expires.

7. The method of claim 6, wherein the step of sending the RRC connection request message and starting the timer further comprising:
   sending the RRC connection request message and starting the timer after the UE passes the ACB check.

8. The method of claim 6, wherein the RA failure event is configured with a GBR traffic type, and the step of reporting the at least one accessing failure event further comprising:
reporting the RA failure event and historical RA failure events if a RRC connection is available.

9. A user equipment (UE), comprising:
a storage circuit, storing a plurality of modules;
a transceiver; and
a processor, operatively coupled to the storage circuit and the transceiver, accessing and executing the modules, wherein the modules comprises:
a receiving module, controlling the transceiver to receive a configuration signal when the UE is preparing into idle mode; and
a measuring module, performing an accessibility measurement of a guaranteed bit rate (GBR) mechanism in response to the configuration signal, wherein the accessibility measurement comprises:
controlling the transceiver to attempt to establish a GBR traffic connection to perform an access class barring (ACB) check;
recording at least one accessing failure event if the UE fails to establish the GBR traffic connection, wherein the at least one accessing failure event comprising a barred event representing that the UE fails to pass the ACB check; and
controlling the transceiver to report the at least one accessing failure event,
wherein the measuring module is further configured to:
record the barred event if the UE fails to pass the ACB check; and
control the transceiver to send a dedicated preamble without passing the ACB check if a number of the barred event reaches a predetermined threshold, wherein the dedicated preamble is used to announce that the at least one accessing failure event exists and is shared by the UE and other UEs.

10. The UE of claim 9, wherein the configuration signal is sent by a control node and is dedicated to request the UE to perform the accessibility measurement.

11. The UE of claim 9, wherein the measuring module is further configured to:
control the transceiver to report a serving cell identification, a GBR traffic type, a location, a time stamp and a number of the barred event if a radio resource control (RRC) connection is available; and
clear the at least one accessing failure event after reporting.

12. The UE of claim 9, wherein the measuring module is configured to:
clear the at least one accessing failure event and returning to the idle mode.

13. The UE of claim 9, wherein the measuring module is further configured to:
clear the at least one accessing failure event after the UE experiences a cell-reselection.

14. The UE of claim 9, wherein the at least one access failure event comprises a random access (RA) failure event, and the measuring module is further configured to:
record the RA failure event if the transceiver of the UE fails to receive a RRC connection setup message before a timer expires.

15. The UE of claim 14, wherein the RA failure event is configured with a GBR traffic type, and the measuring module is further configured to:
report the RA failure event and historical RA failure events if a RRC connection is available.

16. A method for adjusting access control mechanism, adapted to a control node, comprising:
sending a configuration signal to user equipment (UE) being preparing into idle mode to request the UE to perform an accessibility measurement of a guaranteed bit rate (GBR) mechanism and to report at least one accessing failure event recorded in the accessibility measurement, wherein the at least one accessing failure event comprising a barred event representing that the UE fails to pass an access class barring (ACB) check;
receiving the at least one accessing failure event from the UE; and
adjusting an access control mechanism based on the at least one accessing failure event,
wherein the step of receiving the at least one accessing failure event from the UE further comprises:
receiving a dedicated preamble from the UE failing to pass the ACB check, wherein the dedicated preamble is used to announce that the at least one accessing failure event exists and is shared by the UE and other UEs.

17. The method of claim 16, wherein the step of receiving the at least one accessing failure event from the UE further comprises:
receiving a serving cell identification, a GBR traffic type, a location, a time stamp and a number of the barred event if a radio resource control (RRC) connection between the UE and the control node is available.

18. The method of claim 16, further comprising:
not assigning a random access response (RAR) in response to the dedicated preamble.

19. The method of claim 16, wherein the step of deciding the access control mechanism based on the at least one accessing failure event further comprises:
activating a ACB skip mechanism if a number of the dedicated preamble from the UE and the other user equipments reaches a threshold.

20. The method of claim 16, wherein the at least one access failure event comprises the random access (RA) failure event configured with a GBR traffic type, and the step of receiving the at least one accessing failure event from the UE further comprises:
receiving the RA failure event and historical RA failure events if a radio resource control (RRC) connection between the UE and the control node is available.

21. A control node, comprising:
a storage circuit, storing a plurality of modules;
a transceiver; and
a processor, operatively coupled to the storage circuit and the transceiver, accessing and executing the modules, wherein the modules comprises:
a configuring module, controlling the transceiver to send a configuration signal to user equipment (UE) being preparing into idle mode to request the UE to perform an accessibility measurement of a guaranteed bit rate (GBR) mechanism and to report at least one accessing failure event recorded in the accessibility measurement, wherein the at least one accessing failure event comprising a barred event representing that the UE fails to pass an access class barring (ACB) check;
a transceiving module, controlling the transceiver to receive the at least one accessing failure event from the UE and controlling the transceiver to receive a dedicated preamble from the UE failing to pass the ACB check, wherein the dedicated preamble is used to announce that the at least one accessing failure event exists and is shared by the UE and other UEs; and an adjusting module, adjusting an access control mechanism based on the at least one accessing failure event.

22. The control node of claim 21, wherein the transceiving module is further configured to:

control the transceiver to receive a serving cell identification, a GBR traffic type, a location, a time stamp and a number of the barred event if a radio resource control (RRC) connection between the UE and the control node is available.

23. The control node of claim 21, wherein the transceiving module is further configured to:

control the transceiver to not assign a random access response (RAR) in response to the dedicated preamble.

24. The control node of claim 21, wherein the adjusting module is further configured to:

activate a ACB skip mechanism if a number of the dedicated preamble from the UE and the other user equipments reaches a threshold.

25. The control node of claim 21, wherein the at least one access failure event comprises a random access (RA) failure event configured with a GBR traffic type, and the transceiving module is further configured to:

receiving the RA failure event and historical RA failure events if a radio resource control (RRC) connection between the UE and the control node is available.

26. An accessing failure event reporting method, adapted to user equipment (UE), comprising:

receiving a configuration signal when the UE is preparing into idle mode;

performing an accessibility measurement of a guaranteed bit rate (GBR) mechanism in response to the configuration signal, wherein the accessibility measurement comprises:

attempting to establish a GBR traffic connection;

recording at least one accessing failure event if the UE fails to establish the GBR traffic connection; and reporting the at least one accessing failure event, wherein the at least one access failure event comprises a random access (RA) failure event, and the step of attempting to establish the GBR traffic connection further comprises:

sending a radio resource control (RRC) connection request message and starting a timer; and if the UE fails to establish the GBR traffic connection, the step of recording the at least one accessing failure event comprises:

recording the RA failure event if the UE fails to receive a RRC connection setup message before the timer expires.

27. A user equipment (UE), comprising:
a storage circuit, storing a plurality of modules;
a transceiver; and
a processor, operatively coupled to the storage circuit and the transceiver, accessing and executing the modules, wherein the modules comprises:

a receiving module, controlling the transceiver to receive a configuration signal when the UE is preparing into idle mode; and a measuring module, performing an accessibility measurement of a guaranteed bit rate (GBR) mechanism in response to the configuration signal, wherein the accessibility measurement comprises:

controlling the transceiver to attempt to establish a GBR traffic connection;

recording at least one accessing failure event if the UE fails to establish the GBR traffic connection; and controlling the transceiver to report the at least one accessing failure event, wherein the at least one access failure event comprises a random access (RA) failure event, and the measuring module is further configured to:

record the RA failure event if the transceiver of the UE fails to receive a RRC connection setup message before a timer expires.

28. A method for adjusting access control mechanism, adapted to a control node, comprising:

sending a configuration signal to user equipment (UE) being preparing into idle mode to request the UE to perform an accessibility measurement of a guaranteed bit rate (GBR) mechanism and to report at least one accessing failure event recorded in the accessibility measurement;

receiving the at least one accessing failure event from the UE; and adjusting an access control mechanism based on the at least one accessing failure event, wherein the at least one access failure event comprises a random access (RA) failure event configured with a GBR traffic type, and the step of receiving the at least one accessing failure event from the UE further comprises:

receiving the RA failure event and historical RA failure events if a radio resource control (RRC) connection between the UE and the control node is available.

29. A control node, comprising:
a storage circuit, storing a plurality of modules;
a transceiver; and
a processor, operatively coupled to the storage circuit and the transceiver, accessing and executing the modules, wherein the modules comprises:

a configuring module, controlling the transceiver to send a configuration signal to user equipment (UE) being preparing into idle mode to request the UE to perform an accessibility measurement of a guaranteed bit rate (GBR) mechanism and to report at least one accessing failure event recorded in the accessibility measurement;

a transceiving module, controlling the transceiver to receive the at least one accessing failure event from the UE; and an adjusting module, adjusting an access control mechanism based on the at least one accessing failure event, wherein the at least one access failure event comprises a random access (RA) failure event configured with a GBR traffic type, and the transceiving module is further configured to receive the RA failure event and historical RA failure events if a radio resource control (RRC) connection between the UE and the control node is available.

* * * * *